United States Patent [19]

Kobayashi

[11] Patent Number: 5,046,215

[45] Date of Patent: Sep. 10, 1991

[54] WIPER FOR VEHICLES

[75] Inventor: Toshio Kobayashi, Hatano, Japan

[73] Assignee: Nissan Motor Co., Ltd., Yokohama, Japan

[21] Appl. No.: 389,232

[22] Filed: Aug. 3, 1989

[30] Foreign Application Priority Data

Aug. 11, 1988 [JP] Japan .............................. 63-198791

[51] Int. Cl.[5] .............................................. B60S 1/34
[52] U.S. Cl. ................................ 15/250.2; 15/250.34; 15/250.35
[58] Field of Search ........... 15/250.20, 250.22, 250.04, 15/250.05, 250.06, 250.07, 250.08, 250.09, 250.19, 250.34, 250.35

[56] References Cited

U.S. PATENT DOCUMENTS

| | | | |
|---|---|---|---|
| 1,605,137 | 11/1926 | Norden et al. | 15/250.2 |
| 1,657,916 | 1/1928 | Curtis | 15/250.09 |
| 1,932,630 | 10/1933 | McCarthy | 15/250.09 |
| 1,933,122 | 10/1933 | Sanborn | 15/250.04 |
| 2,648,865 | 8/1953 | Gordon et al. | 15/250.04 |
| 3,008,170 | 11/1961 | Marks | 15/250.04 |
| 3,916,473 | 11/1975 | Williams | 15/250.04 |
| 4,611,364 | 9/1986 | Grubner | 15/250.22 |
| 4,718,139 | 1/1988 | Okuda et al. | 15/250.20 |

FOREIGN PATENT DOCUMENTS

| | | | |
|---|---|---|---|
| 56-60751 | 5/1981 | Japan . | |
| 0139847 | 8/1983 | Japan | 15/250.20 |
| 0135847 | 6/1986 | Japan | 15/250.20 |

Primary Examiner—Harvey C. Hornsby
Assistant Examiner—Gary K. Graham
Attorney, Agent, or Firm—Foley & Lardner

[57] ABSTRACT

A wiper for sweeping off a glass surface of a vehicle, in which an arm head is pivotally mounted on a wiper shaft, and includes a wiper section for sweeping off the glass surface when the arm head is pivoted around the wiper shaft, in which a device for adjusting the thrust pressure of the wiper section against the glass surface and/or a driving device for the wiper section may be arranged in the arm head, and electric power is supplied to the devices through a cord, and in which the arm head also includes a pivot mount portion where the arm head is pivotally mounted on the wiper shaft and a come-out portion formed near the pivot mount portion, for leading out the cord in a tangential line direction of a locus of the pivoting pivot mount portion.

6 Claims, 5 Drawing Sheets

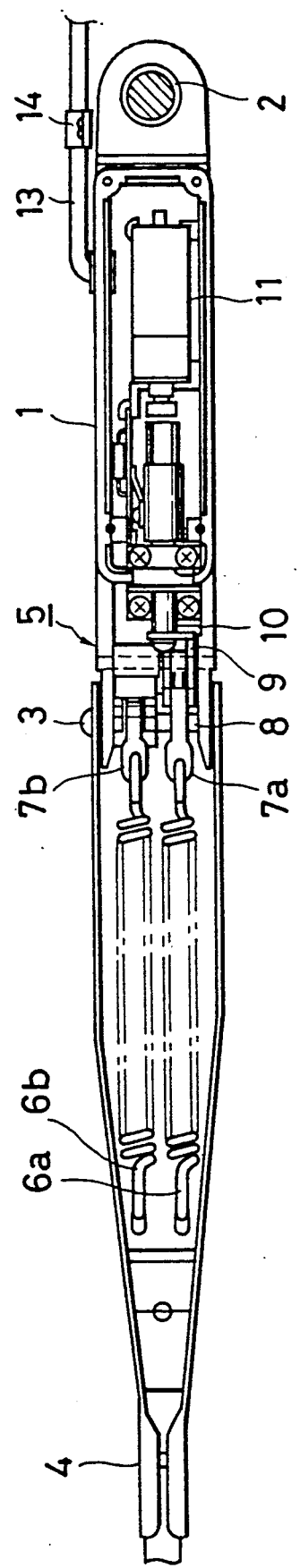
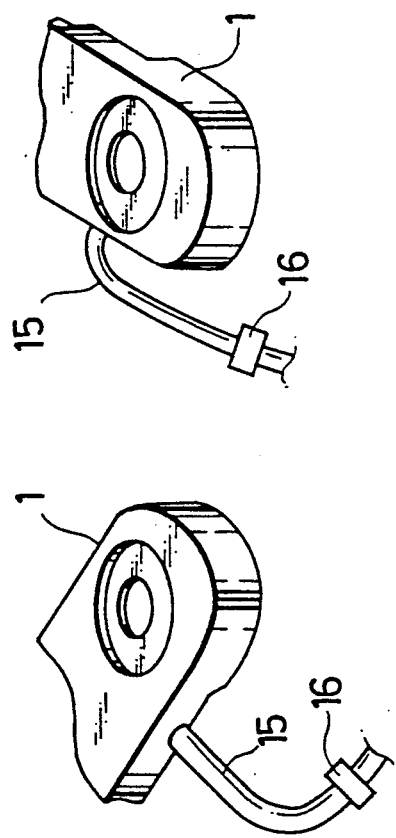
FIG. 1 PRIOR ART
FIG. 2(a)
FIG. 2(b)

WIPER FOR VEHICLES

BACKGROUND OF THE INVENTION

1. Field of the Invention

The present invention relates to a wiper for sweeping off surfaces of glasses of a vehicle.

2. Description of the Background Art

In a conventional wiper, as a running speed of a vehicle is increased, a lift acting on a wiper blade increases. In order to prevent the floating of the wiper blade off a glass surface due to the lift, a variable thrust pressure type wiper has been proposed, in which the pushing pressure of a wiper blade against a glass surface can be varied corresponding to a running speed increase of a vehicle, as disclosed in Japanese Patent Laid-Open Specification No. 56-60751.

There is shown in FIG. 1 one example of a conventional variable thrust pressure type wiper. In FIG. 1, an arm head 1 is pivotally mounted on a wiper shaft 2 so as to pivot around the wiper shaft 2. The arm head 1 is mounted with a wiper section which comprises a wiper arm 4 pivotally connected to the arm head 1 through a pivot shaft 3 and a wiper blade (not shown) mounted to the wiper arm 4. The wiper blade is provided with a contact wiper member composed of rubber or the like, and the contact wiper member is contacted to the glass surface of the vehicle. By pivoting the arm head 1 around the wiper shaft 2 within a certain pivot angle using a driver (not shown) such as a motor, the contact wiper member contacts and wipes or sweeps off the glass surface to remove waterdrops and so forth attached to the glass surface.

The arm head 1 and the wiper arm 4 connected thereto via the pivot shaft 3 constitute a wiper body 5, and a device for adjusting a thrust pressure of the contact wiper member of the wiper blade against the glass surface is arranged within the wiper body 5. The thrust pressure adjusting device includes a pair of coil springs 6a and 6b, a pair of L-shaped levers 7a and 7b, a lever shaft 8, a link rod 9, a movable link member 10 and a geared motor 11. That is, one ends of the coil springs 6a and 6b are secured to the wiper arm 4, and the other ends of the coil springs 6a and 6b are linked to the L-shaped levers 7a and 7b, respectively. The L-shaped levers 7a and 7b are pivotally mounted to the lever shaft 8 and are connected to the link rod 9. The link rod 9 is coupled to the movable link member 10, and the movable link member 10 is connected to the geared motor 11 for moving the movable link member 10 to and from the geared motor 11.

Now, when the geared motor 11 is driven to move the movable link member 10 towards the geared motor 11, the link rod 9 coupled to the movable link member 10 rotates counterclockwise the L-shaped levers 7a and 7b around the lever shaft 8 at different timings. Then, the coil springs 6a and 6b are extended by the L-shaped levers 7a and 7b, respectively, at the different timings to vary the tensions of the coil springs 6a and 6b, thereby adjusting the pushing pressure of the contact wiper member of the wiper blade against the glass surface.

In the conventional wiper shown in FIG. 1, a cord 13 for supplying electric power to an electric circuit for the geared motor 11 and the like is connected to the arm head 1 and is mounted to a peripheral portion of the arm head 1 by using a clip 14 or the like. When the arm head 1 is pivoted around the wiper shaft 2 within a certain pivot angle, the cord 13 is repeatedly bent near the clip 14, and hence in a long period of time of use under hard conditions, the bent portion of the cord 13 is apt to be damaged, e.g., broken or cut.

In another conventional wiper, as shown in FIG. 2, the cord 13 is covered by a flexible protective composed of a polyvinyl resin material or the like to form a harness 15. This harness 15 is drawn out of the arm head 1 in a direction perpendicular to the side surface of the arm head 1 and is mounted in a location apart from the side surface of the arm head 1 by using a clip 16 or the like.

However, in this case, a similar problem to that of the conventional wiper shown in FIG. 1 arises. That is, as shown in FIG. 2b, when the arm head 1 is pivoted in a clockwise direction, the harness 15 is extremely bent near the arm head 1 to damage the extremely bent portion.

SUMMARY OF THE INVENTION

It is therefore an object of the present invention to provide a wiper, free from the aforementioned disadvantages and defects of the prior art, in which no excess force is given to a cord drawn out of an arm head even when the arm head is pivoted around a wiper shaft, and which is capable of preventing damages such as a break or cutting of the cord or the like to improve its reliability.

In accordance with one aspect of the present invention, there is provided a wiper for sweeping off a glass surface of a vehicle, comprising a wiper shaft, an arm head pivotally mounted on the wiper shaft, including a wiper section for sweeping off the glass surface when the arm head is pivoted around the wiper shaft, means for adjusting thrust pressure of the wiper section against the glass surface, the adjusting means being arranged in the arm head, and cord means for supplying electric power to the adjusting means, the arm head also including a pivot mount portion where the arm head is pivotally mounted on the wiper shaft, and a come-out portion formed near the pivot mount portion, for leading out the cord means in a tangential line direction of a locus of the pivoting pivot mount portion.

In accordance with another aspect of the present invention, there is provided a wiper for sweeping off a glass surface of a vehicle, comprising a wiper shaft, an arm head pivotally mounted on the wiper shaft, including a wiper section for sweeping off the glass surface when the arm head is pivoted around the wiper shaft, means for driving the wiper section, arranged in the arm head, and cord means for supplying electric power to the driving means, the arm head also including a pivot mount portion where the arm head is pivotally mounted on the wiper shaft, and a come-out portion formed near the pivot mount portion, for leading out the cord means in a tangential line direction of a locus of the pivoting pivot mount portion.

BRIEF DESCRIPTION OF THE DRAWINGS

FIG. 1 is a fragmentary rear view, partly in section, a rear cover being taken off, of a conventional wiper;

FIG. 2a is a fragmentary perspective view of an arm head portion of another conventional wiper;

FIG. 2b is a fragmentary perspective view, like FIG. 2a but showing the arm head pivoted in a clockwise direction;

3

Figure 3:
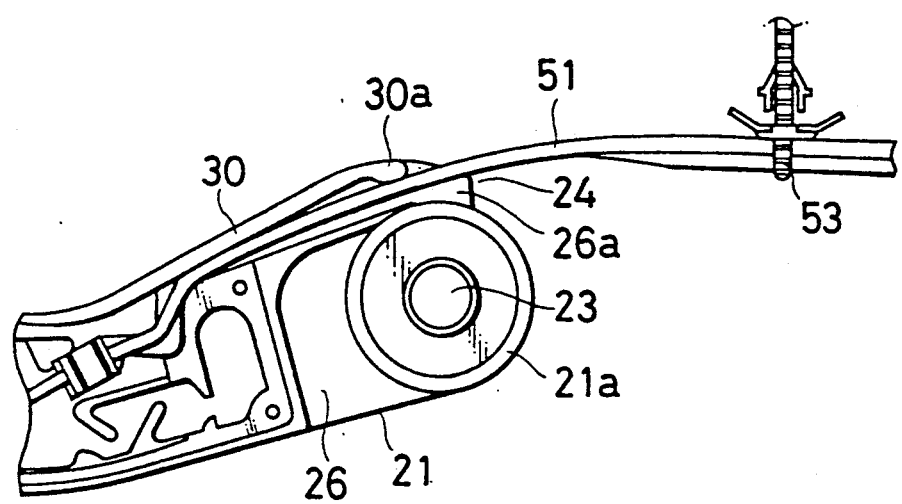
Figure 4:
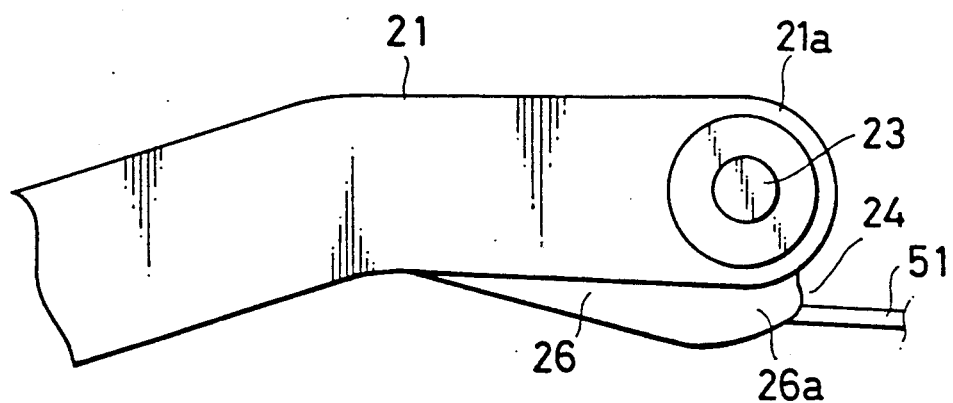
Figure 5:
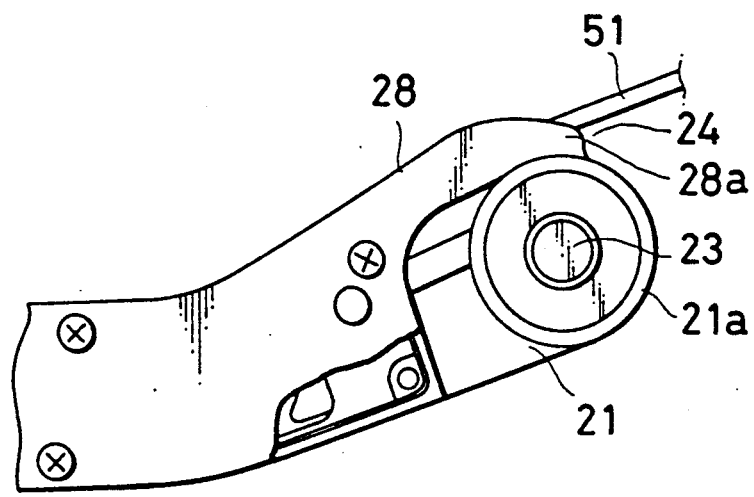
Figure 6:
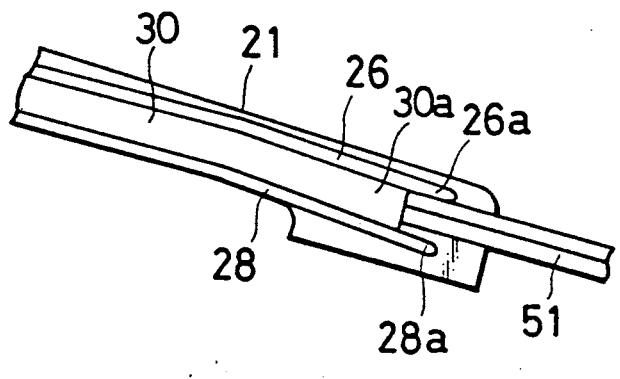
Figure 7:
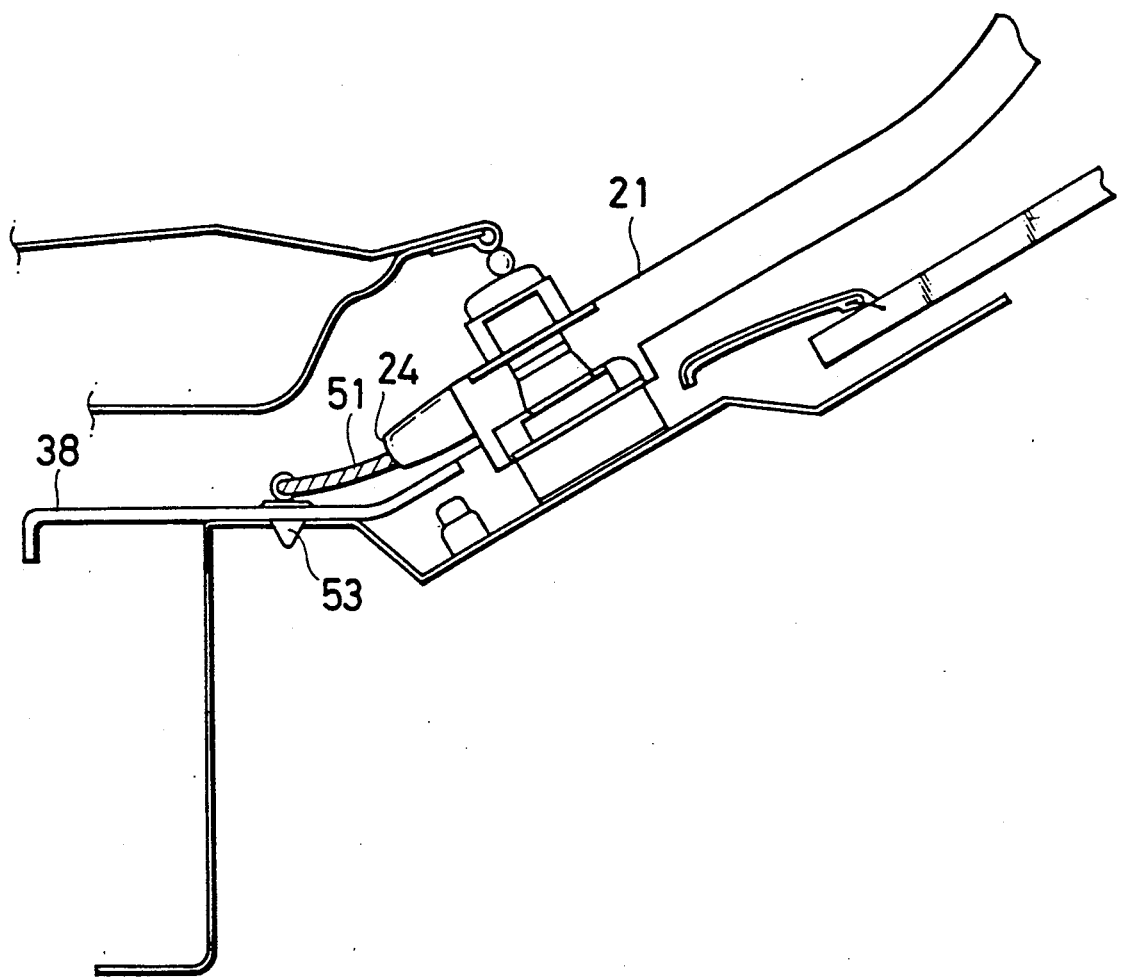

FIG. 3 is a fragmentary rear view, a rear cover being taken off, of an arm head portion of a wiper according to the present invention;

FIG. 4 is a fragmentary elevational view of the wiper shown in FIG. 3;

FIG. 5 is a fragmentary rear view, like FIG. 3, a rear cover being mounted, of FIG. 4;

FIG. 6 is a fragmentary bottom view of FIG. 4;

FIG. 7 shows a cord come-out portion of the wiper shown in FIG. 4; and

Figure 8:
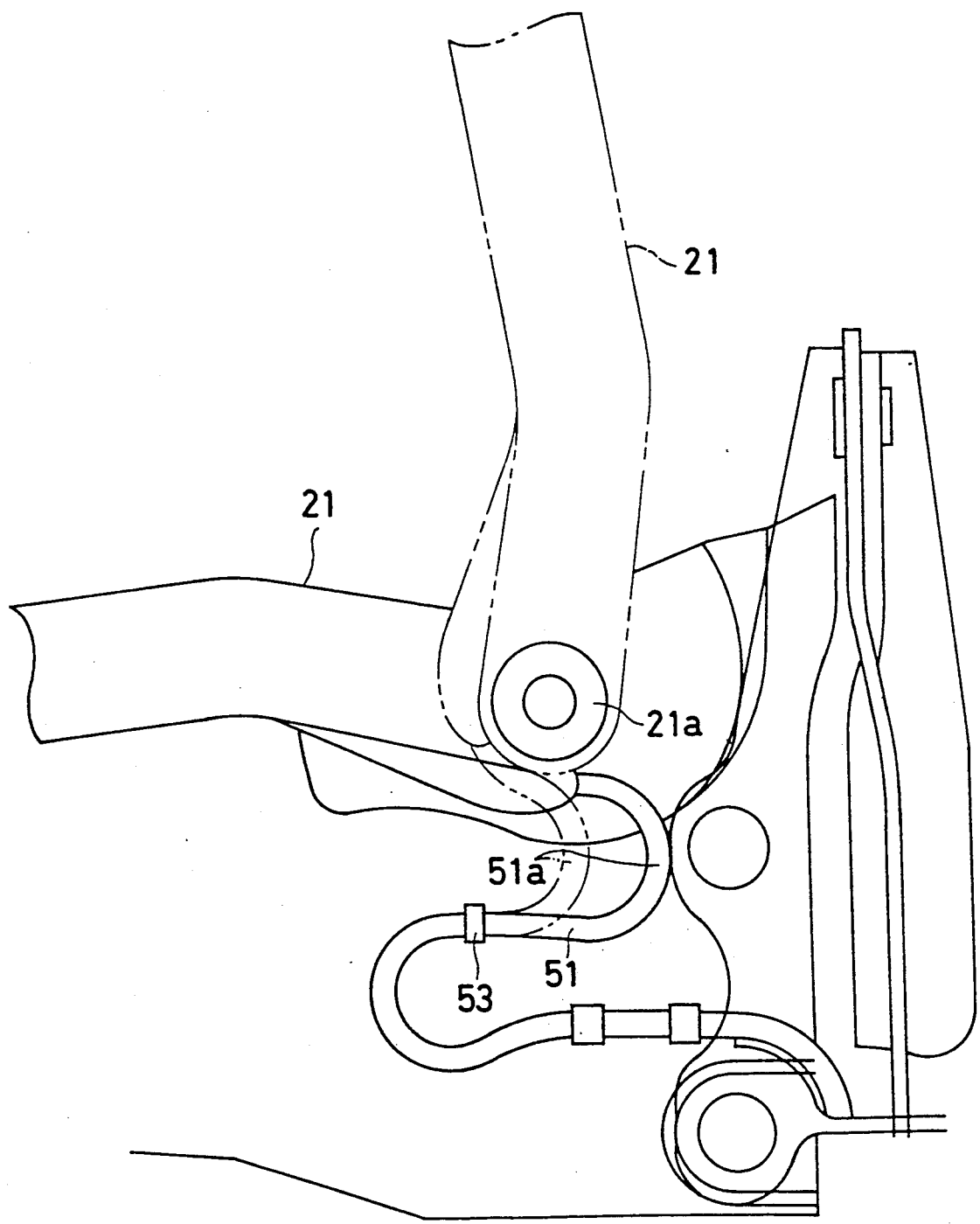

FIG. 8 is a schematic view for explaining a function of the wiper shown in FIG. 4.

DESCRIPTION OF THE PREFERRED EMBODIMENT

Referring now to the drawings, wherein like reference characters designate like or corresponding parts throughout the several views, there is shown in FIGS. 3 to 6 one embodiment of a wiper according to the present invention.

In the drawings, a pivot mount portion 21a of an arm head 21 of a wiper is pivotally mounted on a wiper shaft 23 so as to pivot around the wiper shaft 23 within a certain pivot angle. The arm head 21 is formed with a wiper section (not shown) comprising a wiper arm pivotally connected to the arm head 21 through a pivot shaft and a wiper blade having a contact wiper member, mounted to the wiper arm. By pivoting the arm head 21 around the wiper shaft 23 using a driver (not shown) such as a motor in a conventional manner, the contact wiper member of the wiper blade contacts and wipes or sweeps off glass surfaces of a vehicle to remove waterdrops and so forth attached thereto.

Within the arm head 21, an electric circuit portion including resistors and so forth is arranged and electric power is supplied from the outside to the electric circuit through a cord such as connection wires. This electric circuit forms an adjusting device for a thrust pressure of the wiper blade against the glass surface.

In order to protect the cord, it is covered by a flexible tube composed of a polyvinyl resin material or the like to form a harness 51. This harness 51 is taken out of the arm head 21 from a come-out portion 24. The come-out portion 24 opens in a direction of a tangential line of the pivot mount portion 21a, and by the provision of the come-out portion 24, the harness 51 can be drawn out of the pivot mount portion 21a along the tangential line direction of a locus of the pivoting pivot mount portion 21a.

The come-out portion 24 will be described in more detail. In the arm head 21, front and rear sides are covered by front and rear covers 26 and 28, and the end portions 26a and 28a of the respective front and read covers 26 and 28 are formed as front and rear guide plates. These front and rear guide plates 26a and 28a extend along the periphery of the circular pivot mount portion 21a to restrict the movement of the harness 51 toward the front and rear sides, resulting in that the harness 51 may be taken out within the restricted range of direction.

Further, as shown in FIG. 3, a top plate 30 having a curved end 30a is formed between the front and rear guide plates 26a and 28a, and the top plate 30 and the front and rear guide plates 26a and 28a connected to both the sides thereof define an opening through which the harness 51 is drawn out. The length of the end of the top plate 30 in the tangential line direction is determined shorter than those of the front and rear guide plates 26a and 28a in order to prevent the hitch or catch of the harness 51 at the end of the top plate 30 when the arm head 21 is pivoted in the counterclockwise direction, thereby properly guiding the harness 51. The harness 51 drawn out of the come-out portion 24 is held by a cowling cover 38 and a harness retainer 53, as shown in FIG. 7.

The operation of the wiper according to the present invention will be described in connection with FIG. 8.

In FIG. 8, solid or dotted lines indicate the arm head 21 pivoted to the maximum amount in the counterclockwise or clockwise direction, respectively. When the arm head 21 is pivoted to the maximum amount in the counterclockwise direction, as shown by the solid lines, the harness 51 is guided along the tangential line direction of the periphery of the pivot mount portion 21a, i.e., along the periphery of the circular pivot portion 21a. From this position, as the arm head 21 is pivoted in the clockwise direction, the harness 51 is much more guided along the periphery of the circular pivot mount portion 21a depending on the pivot amount thereof. On this occasion, since the front and rear guide plates 26a and 28a are provided along the periphery of the pivot mount portion 21a, the movement of the harness 51 in the upper and lower directions can be limited to a certain range between the front and rear sides by the front and rear guide plates 26a and 28a. Hence, the harness 51 can not be contacted with the cowling cover 38 and thus can be prevented from its damage due to the contact of the harness with the cowling cover 38.

On the other hand, as the arm head 21 is pivoted to the maximum amount in the clockwise direction, as indicated by the dotted lines, the harness 51 can be wound around the periphery of the pivot mount portion 21a, and a bent portion 51a of the harness 51 is smoothly moved leftwards without giving no excess force to the harness 51. Also, since the end of the top plate 30 is formed in the round form and the end of the top plate 30 is designed to extend shorter than those of the front and read guide plates 26a and 28a, when the arm head 21 is pivoted in the counterclockwise direction, the harness 51 is prevented from the hitch or catch at the end portion of the top plate 30, thereby guiding the harness 51 in a proper manner. Hence, the cord of the harness 51 can be, of course, prevented from the damage such as a break or cutting in the same manner as described above, with the result of the large improvement of the reliability of the wiper according to the present invention.

What is claimed is:

1. A wiper for sweeping off a glass surface of a vehicle, comprising:
   a wiper shaft;
   an arm head pivotally mounted on the wiper shaft, including a wiper section for sweeping off the glass surface when the arm head is pivoted around the wiper shaft;
   means for adjusting thrust pressure of the wiper section against the glass surface, the adjusting means being arranged in the arm head; and
   cord means for supplying electric power to the adjusting means,
   the arm head also including:
   a pivot mount portion where the arm head is pivotally mounted on the wiper shaft; and
   a come-out portion formed near the pivot mount portion, for leading out the cord means in a tangential line direction of a locus of the pivoting pivot mount portion, the come-out portion including a guide portion for defining an opening of the come-out portion and guiding the cord means taken out of the come-out portion, the guide portion including a top plate and front and rear guide plates mounted to front and rear sides of the arm head, the front and rear guide plates being coupled to both sides of the top plate, an end of the top plate extending shorter than those of the front and rear guide plates.

2. The wiper of claim 1, wherein the cord means is covered by a flexible tube to form a harness.

3. The wiper of claim 1, wherein the cord means is held by a retainer and a cowling cover.

4. A wiper for sweeping off a glass surface of a vehicle, comprising:
a wiper shaft;
an arm head pivotally mounted on the wiper shaft, including a wiper section for sweeping off the glass surface when the arm head is pivoted around the wiper shaft;
means for driving the wiper section, arranged in the arm head; and
cord means for supplying electric power to the driving means,
the arm head also including:
a pivot mount portion where the arm head is pivotally mounted on the wiper shaft;
a come-out portion formed near the pivot mount portion, for leading out the cord means in a tangential line direction of a locus of the pivoting pivot mount portion, the come-out portion including a guide portion for defining an opening of the come-out portion and guiding the cord means taken out of the come-out portion, the guide portion including a top plate and front and rear guide plates mounted to front and rear sides of the arm head, the front and rear guide plates being coupled to both sides of the top plate, an end of the top plate extending shorter than those of the front and rear guide plates, and means for adjusting thrust pressure of the wiper section against the glass surface, and the electric power being supplied to the adjusting means through the cord means.

5. A wiper for sweeping off a glass surface of a vehicle, comprising:
a wiper shaft;
an arm head pivotally mounted on the wiper shaft, including a wiper section for sweeping off the glass surface when the arm head is pivoted around the wiper shaft;
means for adjusting thrust pressure of the wiper section against the glass surface, the adjusting means being arranged in the arm head; and
cord means for supplying electric power to the adjusting means,
the arm head also including:
a pivot mount portion where the arm head is pivotally mounted on the wiper shaft; and
a come-out portion formed near the pivot mount portion, for leading out the cord means in a tangential line direction of a locus of the pivoting pivot mount portion, the come-out portion including a guide portion for defining an opening of the come-out portion and guiding the cord means taken out of the come-out portion, the guide portion including a top plate having a round end and front and rear guide plates mounted to front and rear sides of the arm head, the front and rear guide plates being coupled to both sides of the top plate.

6. A wiper for sweeping off a glass surface of a vehicle, comprising:
a wiper shaft;
an arm head pivotally mounted on the wiper shaft, including a wiper section for sweeping off the glass surface when the arm head is pivoted around the wiper shaft;
means for driving the wiper section, arranged in the arm head; and
cord means for supplying electric power to the driving means,
the arm head also including:
a pivot mount portion where the arm head is pivotally mounted on the wiper shaft;
a come-out portion formed near the pivot mount portion, for leading out the cord means in a tangential line direction of a locus of the pivoting pivot mount portion, the come-out portion including a guide portion for defining an opening of the come-out portion and guiding the cord means taken out of the come-out portion, the guide portion including a top plate having a round end and front and rear guide plates mounted to front and rear sides of the arm head, the front and rear guide plates being coupled to both sides of the top plate, and means for adjusting thrust pressure of the wiper section against the glass surface, and the electric power being supplied to the adjusting means through the cord means.

* * * * *